Patented Nov. 10, 1942

2,301,361

UNITED STATES PATENT OFFICE 2,301,361

POLYMETHINE COMPOUNDS AND THEIR PREPARATION

Leslie G. S. Brooker and Frank L. White, Rochester, N. Y., assignors to Eastman Kodak Company, Rochester, N. Y., a corporation of New Jersey No Drawing. Application November 19, 1940, Serial No. 366,276. In Great Britain May 9, 1939

11 Claims. (Cl. 260—240)

This invention relates to polymethine compounds and to a process for the preparation thereof.

A class of polymethine compounds of value in the preparation of carbocyanine dyes is that embracing the β-arylaminovinyl cyclammonium quaternary salts, prepared by condensing a diarylformamidine with a cyclammonium quaternary salt containing a reactive methyl group. Some of these polymethine compounds sensitize photographic silver halide emulsions. The corresponding substituted polymethine compounds, bearing a substituent on the β-carbon atom of the vinyl group, cannot be prepared by an analogous condensation. However, some of such chain-substituted polymethine compounds can be prepared by condensing arylthioimides with cyclammonium quaternary salts containing a reactive methyl group. These chain-substituted compounds are useful in the preparation of chain-substituted carbocyanine dyes, and some of the compounds, like the unsubstituted compounds, sensitize photographic emulsions weakly.

We have now found a new method for preparing certain of chain-substituted polymethine compounds, which method is much more applicable than the prior process, to the production of chain-substituted compounds wherein the β-arylamino group is a naphthylamino group or a substituted phenylamino group, such as a p-chlorophenylamino group or a p-methoxyphenylamino group for example. We have further found that some of the new chain-substituted polymethine compounds obtainable by our new process, are strong sensitizers of photographic silver halide emulsions. Moreover, by our new process chain-substituted β-aliphatic aminovinyl compounds can be prepared.

It is, accordingly, an object of our invention to provide a new process for preparing polymethine compounds. A further object is to provide new polymethine compounds. A further object is to provide photographic emulsions sensitized with polymethine compounds. Other objects will become apparent hereinafter.

In accordance with our invention, and as set forth in our copending application Serial No. 330,580, filed April 19, 1940, (now United States Patent 2,231,659, dated February 11, 1941), of which the instant application is a continuation-in-part, we prepare chain-substituted β-arylaminovinyl and β-aliphatic aminovinyl compounds by condensing a primary or secondary aliphatic or aromatic amine with a halogenovinyl compound of the following general formula:

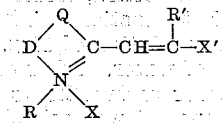

wherein D represents a divalent organic radical, such as a phenylene or a naphthylene group, Q represents sulfur or selenium, R represents an alkyl or an aryl group, R' represents an alkyl or an aryl group, X represents an acid radical and X' represents halogen.

The condensations are advantageously conducted in a solvent consisting of an alcohol of the formula $C_nH_{2n+1}OH$ wherein $n$ represents a positive integer, which alcohol is miscible with water. Heat accelerates the condensations.

The following examples will serve to illustrate our new process and products.

EXAMPLE 1.—2-[2-(β-naphthylamino) propenyl]-benzothiazole ethiodide

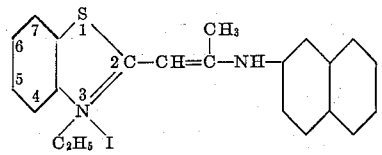

12.0 g. (1 mol.) of 2-(2-chloropropenyl)-benzothiazole ethochloride and 13.8 g. (2.2 mol.) of β-naphthylamine were placed in 50 cc. of absolute ethyl alcohol. The mixture was boiled, under reflux, with stirring, for 15 minutes. To the hot reaction mixture there was added a hot solution of 14.5 g. of potassium iodide in 100 cc. of water. The resulting mixture was chilled to 0° C. for 20 hours, and the polymethine compound was then collected on a filter and washed with cold water. The compound was then stirred with hot acetone, the acetone mixture chilled to 0° C. and the compound filtered off. The compound was washed on the filter with acetone. The crude compound (10.65 g.) was extracted as follows: first extract with 170 cc. of ethyl alcohol, second extract with 355 cc. of methyl alcohol and the third extract with 220 cc. of methyl alcohol. Upon chilling, there was obtained from the second extract 2.44 g. of solid and from the third extract 1.60 g. of solid. Both of these solid fractions had the same melting point and after recrystallization from methyl alcohol were obtained as brownish crystals, melting at 262° to 263° C. with decomposition. The compound sensitized a photographic gelatino-silver-chloride emulsion to about 500 mu. with a maximum at about 445 mu. The corresponding compound obtained from a α-naphthylamine did not sensitize a silver chloride emulsion.

EXAMPLE 2.—2-[2-(p-toluino) propenyl]β-naphthothiazole ethiodide

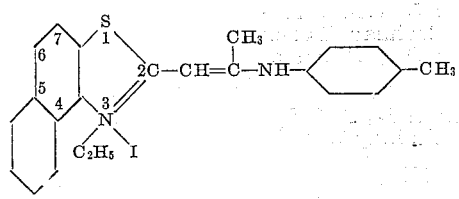

7.2 g. (2 mol.) of p-toluidine were added with stirring to a suspension of 10.8 g. (1 mol.) of 2-(2-cholopropenyl)-β-naphthothiazole ethochloride in 25 cc. of absolute ethyl alcohol. The resulting mixture was boiled, under reflux, for 15 minutes. The hot reaction mixture was then treated with a hot solution of 12 g. of potassium iodide in 100 cc. of water. After chilling the resulting mixture for several hours at 0° C., the polymethine compound was collected on a filter and washed with water. It was then stirred with 25 cc. of hot acetone, and the resulting suspension was chilled to 0° C. The polymethine compound was again collected on a filter, and washed on the filter with acetone. After two recrystallizations from methyl alcohol, including a treatment with activated charcoal, the polymethine compound was obtained as brownish-yellow crystals, melting at 203° C. with decomposition. The compound sensitized a photographic gelatino-silver-chloride emulsion to about 500 mu with a maximum at about 465 mu.

EXAMPLE 3.—2-(2-anilinopropenyl)-β-naphthothiazole ethiodide

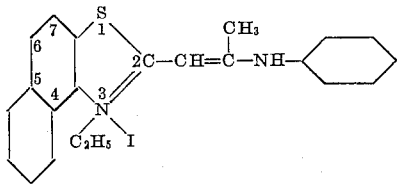

To 1.62 g. (1 mol.) of 2-(2-chloropropenyl)-β-naphthothiazole ethochloride dissolved in 5 cc. of absolute ethyl alcohol was added 0.93 g. (2 mols.) of aniline. The reaction mixture was allowed to stand at room temperature for a period of about 2 hours. The product was converted to the iodide by treating the warmed reaction mixture with 10 cc. of an aqueous solution of 2 grams of potassium iodide. The crystals which formed from the chilled mixture were collected on a filter and washed with water. The residue was stirred in a beaker with acetone, the suspension chilled, and the crystals filtered off and washed with acetone. The yield of product was 60% crude and 19% after two recrystallizations from 95% ethyl alcohol (65 cc. per gram of dye). The dull yellow crystals melted at 238–239° C. with decomposition. The dye sensitized a photographic silver chloride emulsion to 500 mu with a maximum sensitivity at 470 mu.

EXAMPLE 4.—2-[2-(1-piperidyl)propenyl]-β-naphthothiazole ethiodide

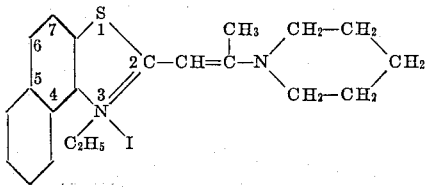

To 1.62 g. (1 mol.) of 2-(2-chloropropenyl)-β-naphthothiazole ethochloride dissolved in 5 cc. of absolute ethyl alcohol was added 0.85 g. (2 mols.) of piperidine. The reaction mixture was allowed to stand with occasional shaking at room temperature for a period of about 2 hours. The product was then converted to the iodide by treating the warmed reaction mixture with a hot solution of potassium iodide (2 g. in 10 cc. of water). The crystals which formed from the chilled mixture were collected on a filter and washed with water. The residue was stirred in a beaker with acetone (15 cc.) and after chilling the suspension, the buff colored crystals were washed on the filter with acetone. The yield of new product was 62% crude and 28% after two recrystallizations from 95% ethyl alcohol (10 cc. per gram of dye). The dull greenish yellow crystals melted at 169–170° C. with decomposition. The dye sensitized a photographic silver chloride emulsions to 450 mu with a maximum at 425 mu.

If the piperidine is substituted by an equivalent amount of morpholine, there is obtained the corresponding dye compound 2-[2-(4-morpholyl)propenyl]-β-naphthothiazole ethiodide. The yield of new product was 69% crude and 19% after two recrystallizations from 95% ethyl alcohol, including a treatment with decolorizing charcoal during the first recrystallization. The brownish yellow crystals melted at 241-242° C. with decomposition. The dye sensitized a photographic silver chloride emulsion to 450 mu with a maximum sensitivity at 430 mu.

EXAMPLE 5.—2-(2-anilinopropenyl)-benzothiazole ethiodide

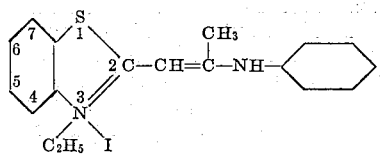

11.5 g. (1.5 mol.) of freshly distilled phosphorous oxychloride were added, with stirring, to a chilled suspension of 10.95 g. (1 mol.) of 2-acetylmethylene-3-ethylbenzothiazoline in 75 cc. of dry benzene. A dark viscous product separated. The benzene layer was decanted, and the residue, 2-(2-chloropropenyl)-benzothiazole ethochloride, was stirred with three successive portions of dry benzene. After draining off the benzene, the residue was dissolved in 50 cc. of absolute ethyl alcohol, and 9 g. of aniline were added to the solution. The resulting mixture was boiled, under reflux, for 15 minutes. The hot reaction mixture was treated with a hot solution of 12 g. potassium iodide in 50 cc. of water. The resulting mixture was chilled, and the crystals of polymethine compound which separated were collected on a filter and washed with water. After two recrystallizations from ethyl alcohol, one which included a treatment with activated charcoal, the compound was obtained, in 34% yield, as pinkish crystals, melting at 210° to 211° C. with decomposition. The compound did not sensitize photographic silver halide emulsions.

EXAMPLE 6.—2-[2-(p-chloroanilino)propenyl]-β-naphthothiazole ethiodide

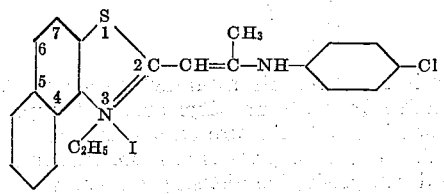

8.5 g. (2 mol.) of p-chloroaniline were added, with stirring, to a suspension of 10.8 g. (1 mol.) of 2-(2-chloropropenyl)-β-naphthothiazole ethochloride in 25 cc. of absolute ethyl alcohol. The resulting mixture was boiled, under reflux, for 15 minutes. The hot reaction mixture was then treated with a hot solution of 12 g. of potassium iodide in 100 cc. of water. After chilling the resulting mixture for several hours at 0° C., the crystalline polymethine compound was collected on a filter and washed with water. The washed product was stirred with 25 cc. of hot acetone. The resulting suspension was chilled to 0° C., the polymethine compound was collected on a filter and washed with acetone. After two recrystallizations from methyl alcohol, one of which included a treatment with activated charcoal, the compound was obtained, in 38% yield, as brownish crystals melting at 205° C. with decomposition. The compound sensitized a photographic gelatino-silver-chloride emulsion to about 500 mu with a maximum at about 470 mu.

EXAMPLE 7.—2-[2-(p-anisidino)propenyl]-β-naphthothiazole ethiodide

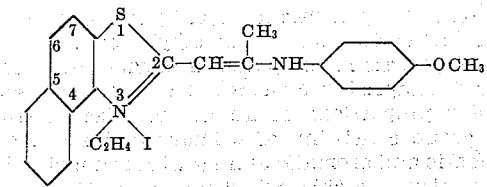

8.2 g. (2 mol.) of p-anisidine were added, with stirring, to a suspension of 10.8 g. (1 mol.) of 2-(2-chloropropenyl)-β-naphthothiazole ethochloride in 25 cc. of absolute ethyl alcohol. The resulting mixture was boiled, under reflux, for 15 minutes. The hot reaction mixture was then treated with a hot solution of 12 g. of potassium iodide in 100 cc. of water. After chilling the resulting mixture for several hours at 0° C., the crystalline polymethine compound was collected on a filter and washed with water. The washed compound was stirred with 25 cc. of hot acetone. The resulting suspension was chilled to 0° C., the polymethine compound collected on a filter and washed with acetone. After two recrystallizations from methyl alcohol, one of which included a treatment with activated charcoal, the compound was obtained, in 35% yield, as bright greenish-yellow crystals which melted at about 154° C., solidified and remelted at 225° C. to 226° C., with decomposition. The compound sensitized a photographic gelatino-silver-chloride emulsion to about 500 mu with a maximum at about 480 mu.

EXAMPLE 8.—2-[2-(p-chloroanilino)-1-butenyl]-benzoselenazole ethiodide

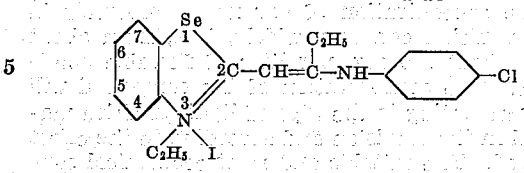

11.5 g. (2.5 mol.) of p-chloroaniline were added, with stirring, to a suspension of 10 g. (1 mol.) of 2-(2-chloro-1-butenyl)-benzoselenazole ethochloride in 25 cc. of absolute ethyl alcohol. The resulting mixture was boiled, under reflux, for 15 minutes. The hot reaction mixture was then treated with a hot solution of 12 g. of potassium iodide in 100 cc. of water. After chilling the resulting mixture for several hours at 0° C., the crystalline polymethine compound was collected on a filter and washed with water. The washed compound was stirred with 25 cc. of hot acetone. The resulting suspension was chilled to 0° C., the compound filtered off and washed with acetone. After two recrystallizations from methyl alcohol the polymethine compound was obtained, in 38% yield, as yellow crystals which melted at 230° to 231° C., with decomposition. The compound did not sensitize photographic gelatino-silver-halide emulsions.

As shown in the above examples, at least two molecular proportions of amine are advantageously employed, for each molecular proportion of halogenovinyl compound. Among the halogenovinyl compounds, the chlorovinyl are advantageously employed, and the halogenovinyl compounds are advantageously employed in the form of the quaternary chlorides.

In a manner similar to that illustrated in the above examples 2-[2-(p-chloroanilino)-1-butenyl]-benzothiazole pheniodide can be prepared from p-chloroaniline and 2-(2-chloro-1-butenyl)-benzothiazole phenochloride (which is described in the copending application of L. G. S. Brooker and G. H. Keyes, Serial No. 356,656, filed September 13, 1940).

Those of our new thiazole polymethine compounds containing a phenylamino group carrying a substituent such as alkyl, alkoxy or halogen in the para position are, in general, strong sensitizers of photographic emulsions. The corresponding compounds devoid of such substituents have little or no sensitizing action upon photographic emulsions. Moreover, the corresponding ortho and meta compounds generally have a much weaker sensitizing action upon photographic emulsions. Among those of our new thiazole polymethine compounds containing a naphthylamino group, the β-naphthylamino compounds are strong sensitizers of photographic emulsions. The corresponding α-naphthylamino compounds, on the other hand, have a much weaker sensitizing action upon photographic emulsions.

In the preparation of photographic emulsions containing our new sensitizing polymethine compounds, it is only necessary to disperse the compounds in the emulsions. It is convenient to add the compounds from solutions in appropriate solvents. Methanol has proven satisfactory as a solvent for the compounds.

Sensitization by means of our new compounds is, of course, directed primarily to the ordinarily employed gelatino-silver-halide developing-out emulsions. The compounds are advantageously incorporated in the washed, finished emulsions and should, of course, be uniformly distributed throughout the emulsions.

The concentration of our new compounds in the emulsion can vary widely, i. e., from about 5 to about 100 mg. per liter of flowable emulsions. The concentration of the compound will vary according to the type of light-sensitive material in the emulsion and according to the effect desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new compounds, the following procedure is satisfactory. A quantity of the compound is dissolved in methyl alcohol or other suitable solvent, and a volume of this solution (which may be diluted with water) containing from 5 to 100 mg. of compound is slowly added to about 1,000 cc. of gelatino-silver-halide emulsion with stirring. Stirring is continued until the compound is uniformly distributed throughout the emulsion. With most of our new sensitizing compounds, 15 to 30 mg. of compound per liter of emulsion suffices to produce the maximum sensitizing effect with the ordinary gelatino-silver-chloride emulsions.

The above statements are only illustrative and are not to be understood as limiting our invention, as it will be apparent that our new compounds can be incorporated by other methods in any of the photographic silver-halide emulsions customarily employed in the art. For instance: the compounds may be incorporated by bathing a plate or film upon which an emulsion has been coated in a solution of the compound in an appropriate solvent. Bathing methods, however, are not to be preferred ordinarily.

What we claim as our invention and desire to be secured by Letters Patent of the United States is:

1. A process for preparing a polymethine compound comprising condensing an amine selected from the group consisting of primary and secondary aliphatic and aromatic amines, with a halogenovinyl compound of the following general formula:

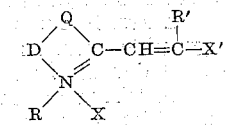

wherein D represents a divalent radical selected from the group consisting of phenylene and naphthylene radicals, Q represents an atom selected from the group consisting of sulfur and selenium atoms, R and R' each represents an organic radical selected from the group consisting of alkyl and aryl radicals, X represents an acid radical and X' represents a halogen atom.

2. A process for preparing a polymethine compound comprising condensing an amine selected from the group consisting of primary and secondary aliphatic and aromatic amines, with a halogenovinyl compound of the following general formula:

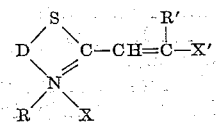

wherein D represents a naphthylene group, R and R' each represents an alkyl group, X represents a halide ion and X' represents a halogen atom.

3. A process for preparing a polymethine compound comprising condensing an amine selected from the group consisting of primary and secondary aliphatic and aromatic amines, with a halogenovinyl compound of the following general formula:

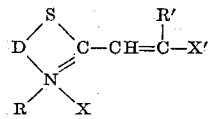

wherein D represents a phenylene group, R and R' each represents an alkyl group, X represents a halide ion and X' represents a halogen atom.

4. A process for preparing a polymethine compound comprising condensing an amine selected from the group consisting of primary and secondary aliphatic and aromatic amines, with a halogenovinyl compound of the following general formula:

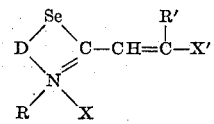

wherein D represents a phenylene group, R and R' each represents an alkyl group, X represents a halide ion and X' represents a halogen atom.

5. A process for preparing a polymethine compound comprising condensing at least two molecular proportions of an amine selected from the group consisting of primary and secondary aliphatic and aromatic amines with one molecular proportion of a chlorovinyl compound of the following general formula:

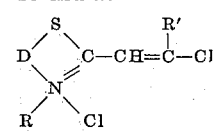

wherein D represents a naphthylene group and R and R' each represents an alkyl group.

6. A process for preparing a polymethine compound comprising condensing at least two molecular proportions of an amine selected from the group consisting of primary and secondary aliphatic and aromatic amines with one molecular proportion of a chlorovinyl compound of the following general formula:

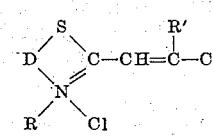

wherein D represents a phenylene group and R and R' each represents an alkyl group.

7. A process for preparing a polymethine compound comprising condensing at least two molecular proportions of an amine selected from the group consisting of primary and secondary aliphatic and aromatic amines with one molecular proportion of a chlorovinyl compound of the following general formula:

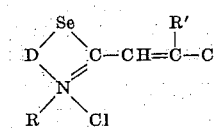

wherein D represents a naphthylene group and R and R' each represents an alkyl group.

8. A polymethine compound of the following general formula:

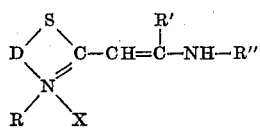

wherein D represents a divalent radical selected from the group consisting of phenylene and naphthylene radicals, R and R' each represents an organic radical selected from the group consisting of alkyl and aryl radicals, R'' represents a β-naphthyl radical and X represents an acid radical.

9. A polymethine compound of the following general formula:

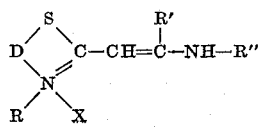

wherein D represents a divalent radical selected from the group consisting of phenylene and naphthylene radicals, R and R' each represents an alkyl radical, R'' represents a β-naphthyl radical and X represents an acid radical.

10. A polymethine compound of the following general formula:

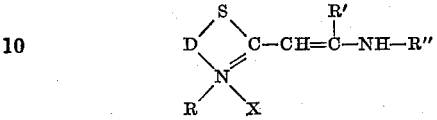

wherein D represents a divalent radical selected from the group consisting of phenylene and naphthylene radicals, R and R' each represents an alkyl radical, R'' represents a β-naphthyl radical and X represents a halide radical.

11. 2-[2-(β-naphthylamino)propenyl]-benzothiazole ethiodide.

LESLIE G. S. BROOKER.
FRANK L. WHITE.